United States Patent [19]

Logan

[11] Patent Number: 5,466,895
[45] Date of Patent: Nov. 14, 1995

[54] WEAR RESISTANT IMPROVED TABLET FOR A DIGITIZER

[75] Inventor: James D. Logan, Windham, N.H.

[73] Assignee: MicroTouch Systems, Inc., Methuen, Mass.

[21] Appl. No.: 178,500

[22] Filed: Jan. 7, 1994

[51] Int. Cl.[6] .............................. G08C 21/00; G09G 3/02
[52] U.S. Cl. .............................. 178/18; 178/19; 345/173; 345/179
[58] Field of Search .................. 178/18, 19; 345/173, 345/179, 177, 180

[56] References Cited

U.S. PATENT DOCUMENTS

| | | | |
|---|---|---|---|
| 4,564,079 | 1/1986 | Moore | 178/18 |
| 4,665,283 | 5/1987 | Kable | 178/19 |
| 4,798,919 | 1/1989 | Miessler | 178/18 |
| 4,801,767 | 1/1989 | Sato | 178/18 |
| 4,853,493 | 8/1989 | Schlosser | 178/18 |
| 4,963,702 | 10/1990 | Yaniger | 178/18 |
| 5,072,076 | 12/1991 | Camp, Jr. | 178/18 |
| 5,220,136 | 6/1993 | Kent | 178/18 |

FOREIGN PATENT DOCUMENTS

| | | |
|---|---|---|
| 2161935 | 3/1988 | United Kingdom . |
| 2223986 | 7/1988 | United Kingdom . |
| 2250822 | 8/1993 | United Kingdom . |

*Primary Examiner*—Stephen Chin
*Assistant Examiner*—Vijay Shankar
*Attorney, Agent, or Firm*—Iandiorio & Teska

[57] ABSTRACT

An improved tablet for a digitizer including a stylus and a tablet for digitizing stylus position on the tablet as a function of the stylus current distribution over the tablet includes a first resistive coating on the face of the tablet for conducting stylus current to a plurality of current sensors about the periphery of the tablet; and one or more additional resistive coatings covering the first resistive coating and connected electrically in parallel with the first resistive coating for providing an additional wearing layer to protect and prolong the life of the first reactive coating, the additional resistive coatings having resistance values higher than the first resistive coating.

16 Claims, 3 Drawing Sheets

WEAR RESISTANT IMPROVED TABLET FOR A DIGITIZER

FIELD OF INVENTION

This invention relates to an improved tablet for a digitizer including a stylus and a tablet for digitizing stylus position on the tablet as a function of the stylus current distribution over the tablet.

BACKGROUND OF INVENTION

Conventional digitizer tablets or pads employ a stylus to draw or write on the tablet surface. The tablet surface contains a resistive coating with current sensors disposed about its periphery. The stylus completes a current loop through the resistive coating to the sensors. The relative distribution of the stylus current among the sensors is a function of the stylus position in the surface. An algorithm is used to calculate the stylus position in response to the currents sensed. One shortcoming of these types of devices is that the resistive coating wears over time as a result of the stylus contact and motion. As the coating becomes thinner with wear the stylus current sensed changes. Since the wear is not uniform across the face of the tablet or screen the resistance varies with position and distorts the current flow so that differences in the currents sensed no longer accurately indicate the position of the stylus but have an error factor caused by the worn resistive coating. In some cases the coating wears through so there is no electrical contact, and at that point the stylus circuit is not complete.

SUMMARY OF INVENTION

It is therefore an object of this invention to provide an improved tablet for a digitizer including a stylus and a tablet for displaying stylus position on the tablet as a function of the stylus current distribution over the tablet.

It is a further object of this invention to provide such an improved tablet that provides increased life of the resistive tablet surface.

It is a further object of this invention to provide such an improved tablet in which over the life of the tablet the resistance of the surface will change only minimally with wear.

The invention results from the realization that a truly long life wear resistant tablet surface can be effected by providing one or more higher resistance resistive coatings covering and electrically in parallel with the first or base resistive coating so that the higher resistance coating(s) wear before the base coating but the electrically parallel, higher resistance of the additional coating(s) reduces the overall resistance of the tablet surface only minimally as it wears away.

This invention features an improved tablet for a digitizer including a stylus and a tablet for digitizing stylus position on the tablet as a function of the stylus current distribution over the tablet. There is a first resistive coating on the face of the tablet for conducting stylus current to a plurality of current sensors about the periphery of the tablet. A second resistive coating covers the first resistive coating and is connected electrically in parallel with the first resistive coating for providing an additional wearing layer to protect and prolong the life of the first resistive coating. The second resistive coating has a resistance value higher than the first resistive coating.

In a preferred embodiment the resistance of the second resistive coating is at least double that of the first resistive coating anti it may be an order of magnitude greater or even 100 times or more greater than the first resistive coating. The second resistive coating may be approximately as thick as the first resistive coating, or it may be thicker or thinner than the first resistive coating.

The invention also features an improved tablet for a digitizer including a stylus and a tablet for digitizing stylus position on the tablet as a function of the stylus current distribution over the tablet. There is a first resistive coating on the face of the tablet for conducting stylus current to a plurality of current sensors about the periphery of the tablet. There are a plurality of additional resistive coatings connected electrically in parallel with each other and with the first resistive coating. Each one of the additional resistive coating covers the next previous coating beginning with the first coating, for providing additional wearing layers to protect and prolong the life of the first resistive coating. Each of the additional resistive coatings has a different resistance which is higher than that of the first resistive coating.

DISCLOSURE OF PREFERRED EMBODIMENT

Other objects, features and advantages will occur to those skilled in the art from the following description of a preferred embodiment and the accompanying drawings, in which:

FIG. 3 is a graphical illustration showing the discontinuity that occurs in the conventional tablet of FIG. 2 as the resistive coating wears through;

This invention may be accomplished in an improved tablet for a digitizer which includes a stylus and a tablet for digitizing stylus position on the tablet as a function of the stylus current distribution over the tablet surface. Typically such devices are used to provide digitized input to a computer system such as a PC or an Apple computer. In accordance with this invention there is a first resistive coating on the face of the tablet for conducting stylus current to a plurality of current sensors about the periphery of the tablet. These current sensors sense the current at different points. The current is then provided to a controller system which according to predetermined algorithms well known in the art calculate the position of the stylus as a function of the relative values of the electric currents. For example, see U.S.

Pat. No. 4,293,734, incorporated herein by reference. Typically, but not necessarily, such current sensors can be placed one at each of the four corners of the tablet. There is a second resistive coating covering the first resistive coating and connected electrically in parallel with the first resistive coating for providing an additional wearing layer to protect and prolong the life of the first resistive coating. The second resistive coating has a resistance value higher than the first resistive coating. Typically it is at least twice the resistance of the first resistive coating. More beneficially it may be one, two or more orders of magnitude greater than the resistance of the first resistive coating. Good results should be obtainable with a resistance ratio of approximately 100:1. The first resistive coating may be made of antimony tin oxide or indium tin oxide and the second resistive coating may be the same material doped for different resistance. The thickness of the first resistive coating may be 200Å to 800Å, for example, and of the second resistive coating may be 200Å to 50,000Å. Typically a resistance of 2,000 Ω/cm² for the first or base layer, and 200,000 Ω/cm² for the second layer should produce satisfactory results. The second resistive coating may be thicker, thinner or the same thickness as the first resistive coating. Furthermore, there need not be only one extra resistive coating in addition to the first or base resistive coating. There may be three or more.

Figure 1:
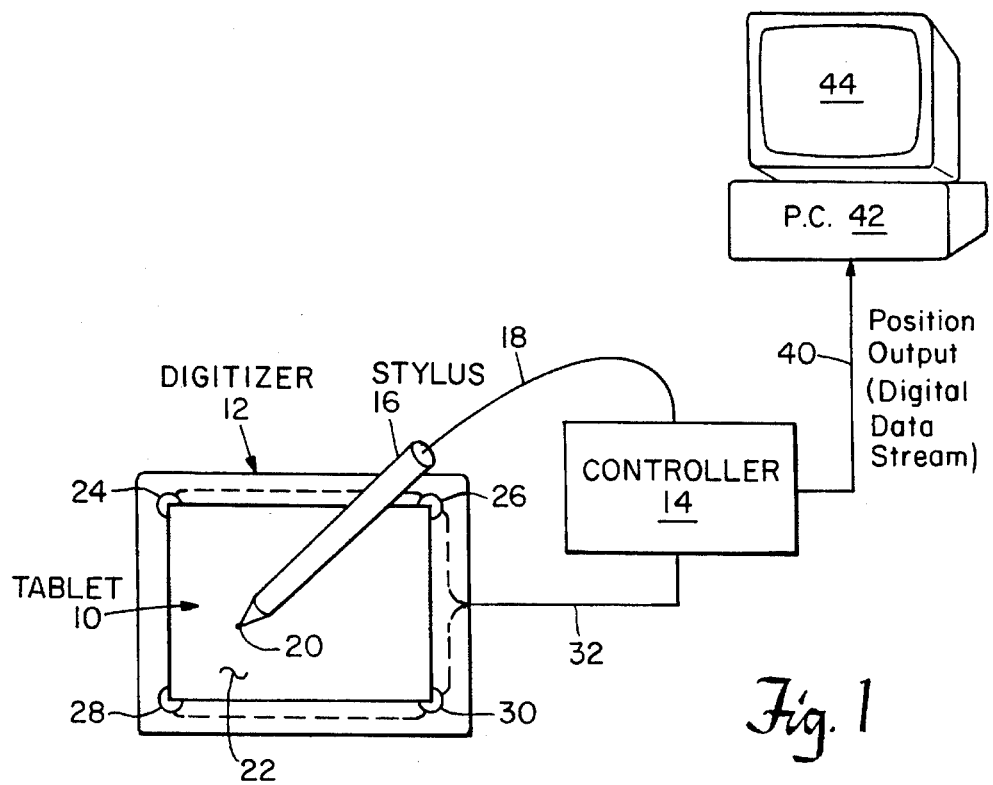
FIG. 1 is a schematic block diagram of an improved tablet according to this invention used in a digitizer system with a conventional computer.

There is shown in FIG. 1 a tablet 10 according to this invention used in a digitizer system including the digitizer 12, controller 14 and stylus 16. Controller 14 provides a current over line 18 to stylus 16. The current flows through stylus 16, out its tip 20, into the surface 22 of tablet 10. Four corner sensors 24, 26, 28 and 30 connected through cable 32 to controller 14, sense the stylus current as it is modulated by its travel along the different paths from tip 20 through the resistive surface 22. Controller 32, using a conventional algorithm, then determines the actual position of tip 20 of stylus 16 on surface 22. This position information may be provided on line 40 to PC 42, where it may be displayed for example on monitor 44.

Figure 2:
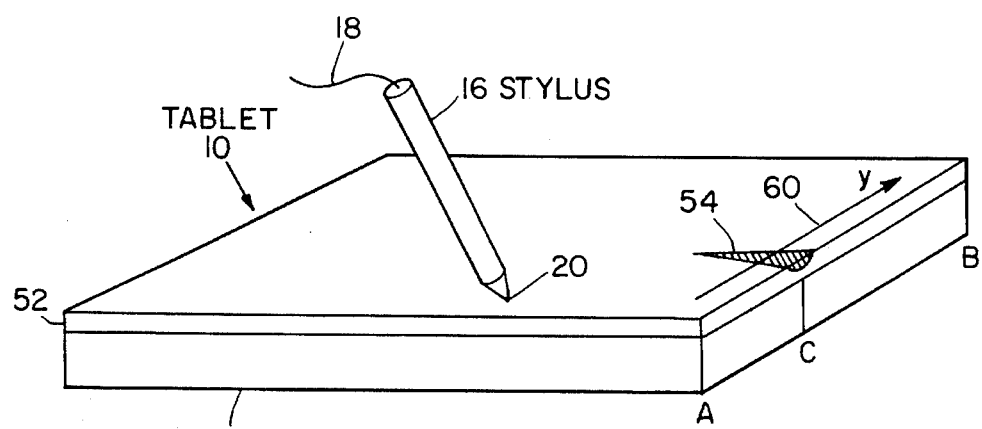
FIG. 2 is a three-dimensional schematic diagram of a conventional digitizer tablet.
Figure 3:
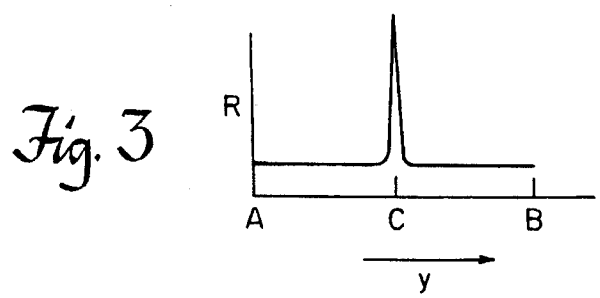

A conventional prior art tablet 10', FIG. 2, typically has a glass substrate 50 on which is deposited the thin film first or base resistive coating 52. Current flowing through stylus 16 is distributed throughout surface 52 and is sensed by, for example, corner sensors 24, 26, 28 and 30, FIG. 1. In this prior art construction, should a wear region occur, such as region 54, a discontinuity will result when tip 20 of stylus 16 is drawn across wear region 54. Substrate 50 is typically made of glass and the thin film resistive coating 52 is made of indium tin oxide or antimony tin oxide. The development of the discontinuity can be demonstrated by visualizing the tip 20 of stylus 16 being drawn along in the direction of arrow 60 in the Y direction, FIG. 2, between points A and B, whereupon it will cross discontinuity region 54 at C. As can be seen in FIG. 3, where the direction Y has been plotted against the resistance R, there is a large discontinuity in the resistance at point C.

Figure 4:
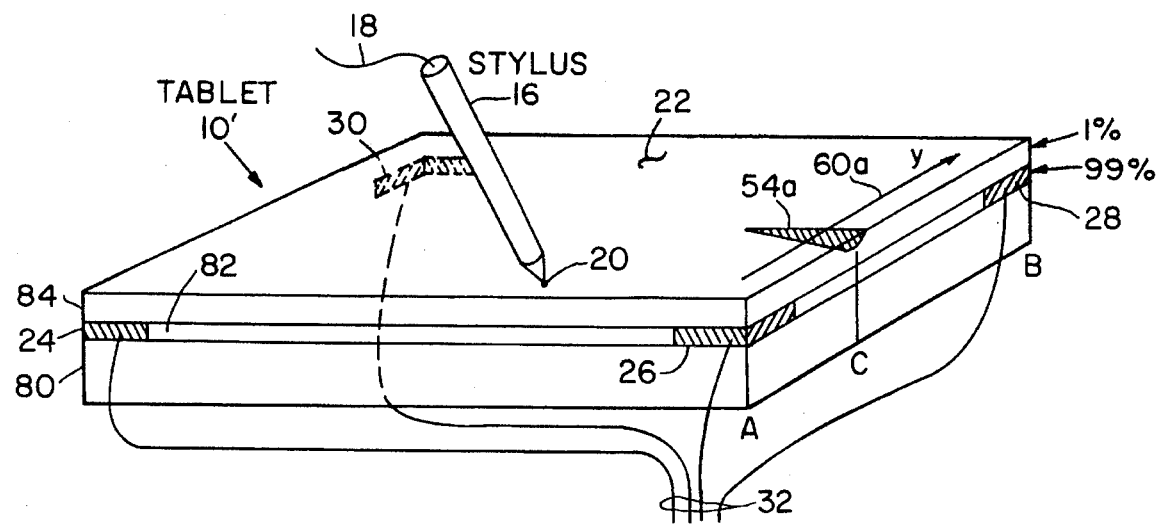
FIG. 4 is a view similar to FIG. 2 of a tablet constructed in accordance with this invention.
Figure 4A:
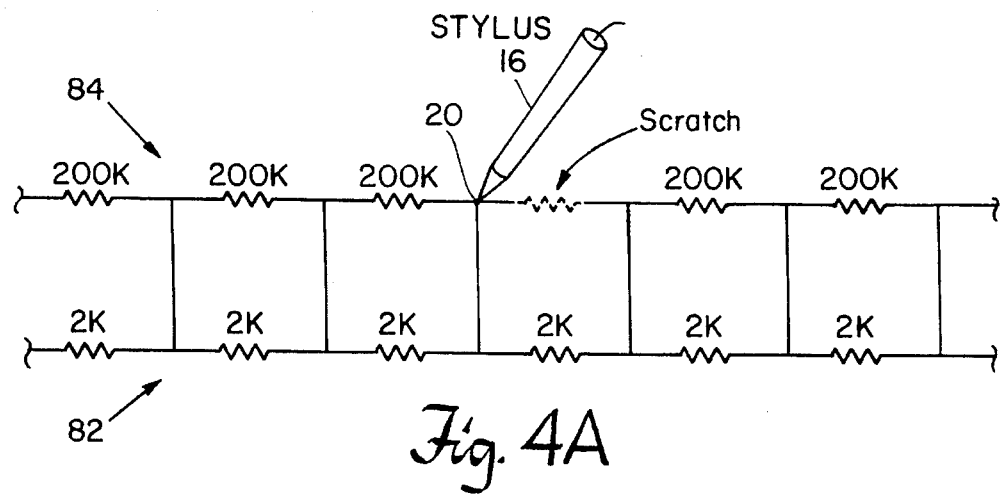
FIG. 4A is a schematic diagram or an equivalent circuit showing the electrical parallel interconnection of the first and second coatings shown in FIG. 4 in accordance with this invention.

However, in accordance with this invention, tablet 10, FIG. 4, is constructed using a glass substrate 80 and a first or base layer 82. On top of first layer 82 is a second layer 84 having a much increased resistance. For example, while coating 82 may be 2000 Ω/cm², coating 84 may be 200,000 Ω/cm². Since the two resistive coatings 82 and 84 are connected electrically in parallel as shown schematically in FIG. 4A, the top coating 84 actually constitutes only 1% of the overall resistance of the surface 22. This can be shown with a basic parallel equivalent resistance formula $$R_s = \frac{R1(R2)}{R1 + R2} \quad (1)$$

where $R_s$ is the total resistance of the surface; $R_1$, the resistance or second coating 84, is 200,000 Ω/cm²; and $R_2$ is the resistance, 2,000 Ω/cm², of first or base coating 82. In that case, as can be seen in Equation (2), $$R_s = \frac{(200,000)(2000)}{202,000} \quad (2)$$

or $$R_s = 1,980 \Omega \quad (3)$$

Figure 5:
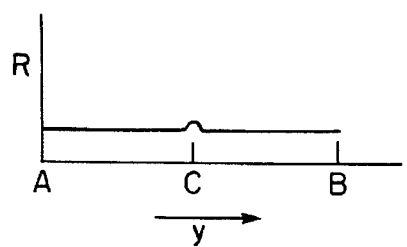
FIG. 5 is a graphical illustration showing the minimal disruption in the resistance level that occurs when the top resistive coating or layer wears through in a two-layer tablet according to this invention shown in FIG. 4.

Thus when the point of stylus 20 crosses wear region 54a, FIG. 4, moving in a direction Y as indicated by arrow 60a, there is very little change in the resistance encountered between points A and B as the tip 20 of stylus 16 crosses point C. Actually the resistance changes from 1980 Ω/cm² to 2000 Ω/cm² and back again to 1980 Ω/cm². This can be seen in FIG. 5, where there is but a very small increase in resistance at point C.

Figure 6:
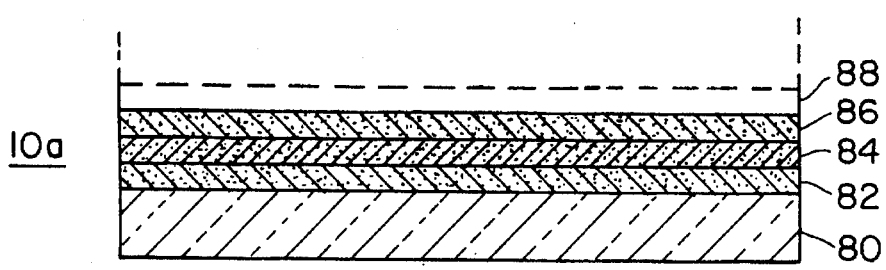
FIG. 6 is a side schematic view of the tablet according to this invention as shown in FIG. 4 but including more than two resistive coatings or layers.
Figure 7:
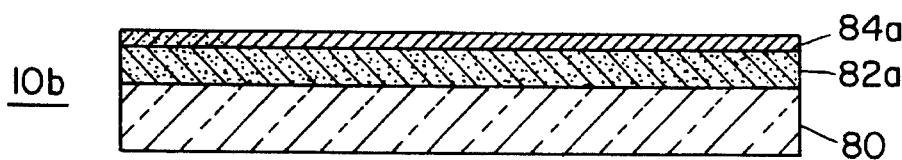
FIGS. 7 and 8 are views similar to FIG. 6 showing two layers in which the second layer is thinner than the first and is the same size as the first, respectively.
Figure 8:
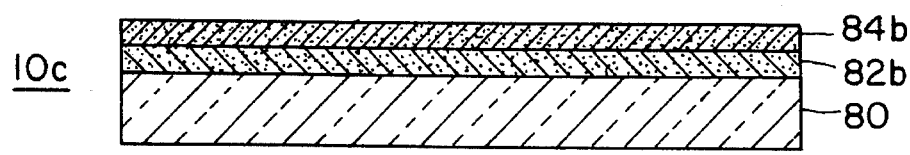

Although thus far only one additional layer is shown on top of the first or base layer 82, this is not a necessary limitation of the invention. For example, as shown in FIG. 6, there may be two, three, four, or even more coatings. For example on top of coating 82 there may be coating 84, covered in turn by coating 86, coating 88, and so on. Also, although in FIG. 4 the second coating or layer 84 is shown as being thicker than first coating or layer 82, this is not a necessary limitation of the invention. For example, as shown in FIG. 7, second coating or layer 84a may be thinner than first coating or layer 82a, or both layers 82b and 84b, may be practically the same thickness as shown in FIG. 8. Also, second layer 84 may be a removable, conductive, sheet, made of plastic.

Although in this embodiment the stylus is shown as a mechanical element it may as well include a human finger such as in capacitance touch screen systems.

Although specific features of this invention are shown ill some drawings and not others, this is for convenience only as each feature may be combined with any or all of the other features in accordance with the invention.

Other embodiments will occur to those skilled in the art and are within the following claims:

What is claimed is:

1. An improved tablet for a digitizer including a stylus for digitizing stylus position on the improved tablet as a function of the stylus current distribution over the improved tablet comprising:

a first resistive coating on the face of the improved tablet for conducting stylus current to a plurality of current sensors about the periphery of the improved tablet; and a second resistive coating, covering said first resistive coating and connected electrically in parallel with said first resistive coating, for providing an additional wearing layer to protect and prolong the life of said first resistive coating, said second resistive coating having a resistance value higher than said first resistive coating.

2. The improved tablet of claim 1 in which the resistance of said second resistive coating is at least double that of said first resistive coating.

3. The improved tablet of claim 1 in which the resistance of said second resistive coating is an order of magnitude greater than that of said first resistive coating.

4. The improved tablet of claim 1 in which the resistance of said second resistive coating is one hundred times greater than that of said first resistive coating.

5. The improved tablet of claim 1 in which said second resistive coating is approximately as thick as said first resistive coating.

6. The improved tablet of claim 1 in which said second resistive coating is thicker than said first resistive coating.

7. The improved tablet of claim 1 in which said second resistive coating is thinner than said first resistive coating.

8. The improved tablet of claim 1 in which said second resistive coating is a removable sheet.

9. An improved tablet for a digitizer including a stylus for digitizing stylus position on the improved tablet as a function of the stylus current distribution over the improved tablet comprising:

a first resistive coating on the face of the improved tablet for conducting stylus current to a plurality of current sensors about the periphery of the improved tablet; and a plurality of additional resistive coatings connected electrically in parallel with each other and with said first resistive coating, each said additional resistive coatings covering the next previous coating beginning with said first resistive coating for providing additional wearing layers to protect and prolong the life of said first resistive coating, each of said additional resistive coatings having a different resistance which is higher than that of said first resistive coating.

10. The improved tablet of claim 9 in which the resistance of said additional resistive coatings is at least double that of said first resistive coating.

11. The improved tablet of claim 9 in which the resistance of said additional resistive coatings is an order of magnitude greater than that of said first resistive coating.

12. The improved tablet of claim 9 in which the resistance of said additional resistive coatings is one hundred times greater than that of said first resistive coating.

13. The improved tablet of claim 9 in which said additional resistive coatings are approximately as thick as said first resistive coating.

14. The improved tablet of claim 9 in which said additional resistive coatings are thicker than said first resistive coating.

15. The improved tablet of claim 9 in which said additional resistive coatings are thinner than said first resistive coating.

16. An improved digitizer, comprising:

a substrate;

a first resistive coating on the substrate for conducting stylus current; and a second resistive coating on said first resistive coating, said second resistive coating connected electrically in parallel with said first resistive coating, for providing an additional wearing layer to protect and prolong the life of said first resistive coating, said second resistive coating having a resistance value higher than said first resistive coating.

* * * * *